Feb. 7, 1956  H. F. LYMAN  2,733,805
DISHWASHING MACHINE RACK CONVEYING APPARATUS
Filed June 22, 1953  2 Sheets—Sheet 1
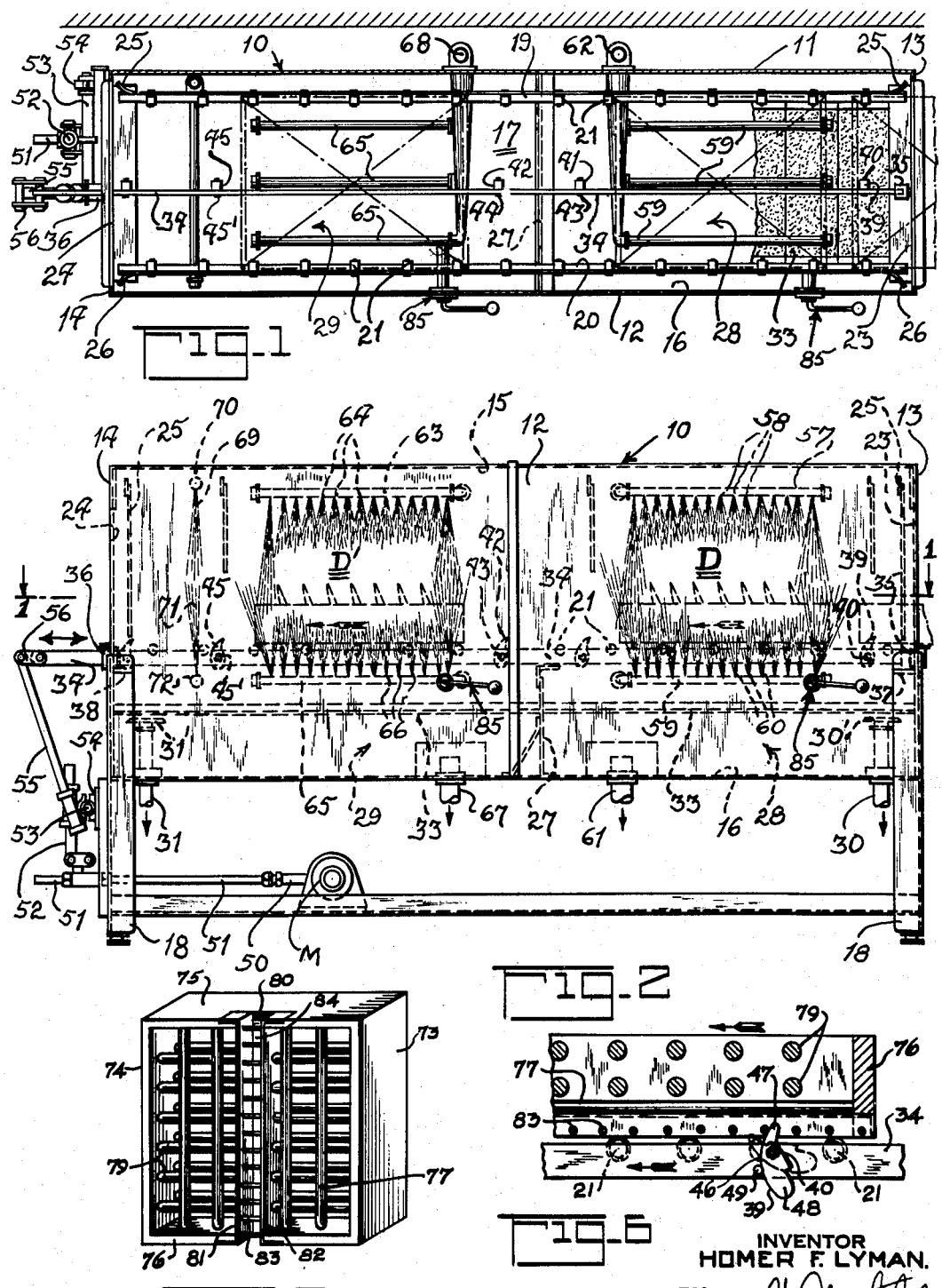
INVENTOR
HOMER F. LYMAN.
BY
ATTORNEY

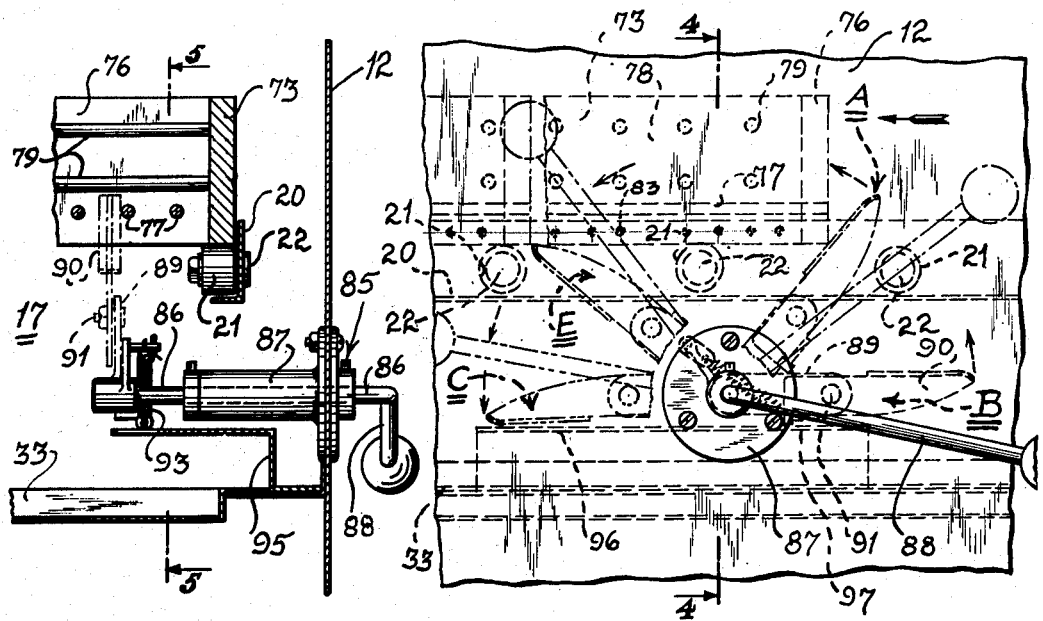
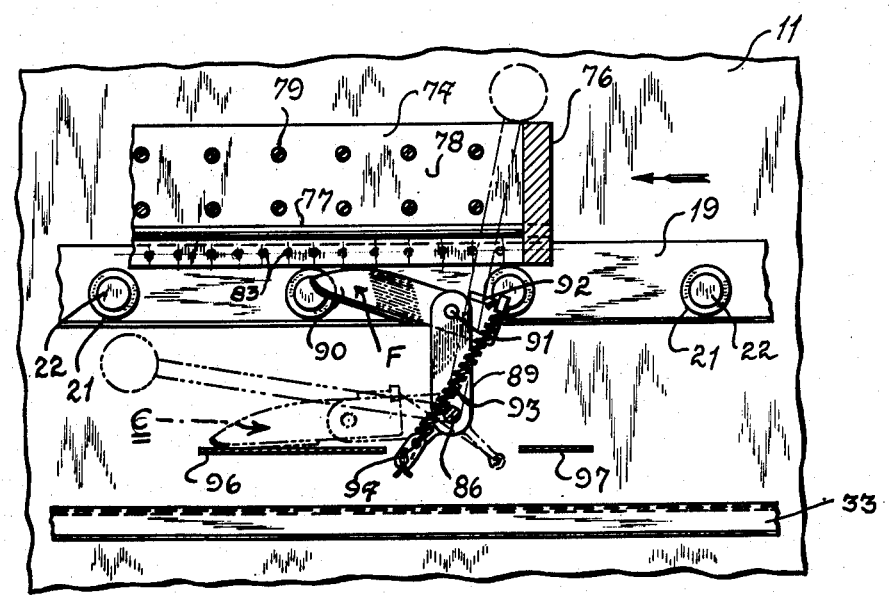

United States Patent Office 2,733,805
Patented Feb. 7, 1956.

2,733,805

DISHWASHING MACHINE RACK CONVEYING APPARATUS

Homer F. Lyman, Nutley, N. J.

Application June 22, 1953, Serial No. 363,167

13 Claims. (Cl. 198—19)

This invention relates to dishwashing machines of the commercial type, as distinguished from those for home use, and more particularly to dishwashing machines wherein a rack of dishes to be washed is conveyed through the dishwashing machine.

The present invention provides a dishwashing machine having a ratchet-type conveyor comprising a reciprocal bar with a plurality of pawls thereon which pawls are adapted to engage a rack of dishes to be cleaned, that is, washed or washed and rinsed, and advance the dishes into a predetermined position within the machine in which position the conveyor is inoperative in respect to the rack of dishes thereby permitting the rack of dishes to dwell in said position while the dishes therein are being subjected to cleaning action. An actuator operative exteriorly of the machine is provided to move the rack of dishes from said cleaning or dwell position when the cleaning operation is completed and into such position that the rack is engaged by other pawls on said reciprocating bar and thereby advanced through the dishwashing machine.

The invention will be understood from the following description when considered in connection with the accompanying drawings forming a part thereof and in which:

Fig. 1 is a horizontal sectional view of a dishwashing and rinsing machine embodying the present invention and taken on the line 1—1 of Fig. 2;

Fig. 2 is a side elevational view of the dishwashing and rinsing machine illustrated in Fig. 1;

Fig. 3 is a side elevational view, on an enlarged scale in comparison to Fig. 1, of a dish-rack actuator operative exteriorly of the dishwashing and rinsing machine;

Fig. 4 is a sectional view taken on the line 4—4 of Fig. 3;

Fig. 5 is a sectional view taken on the line 5—5 of Fig. 4;

Fig. 6 is a side elevational view of the conveyor mechanism illustrating one of the pawls thereon, and Fig. 7 is a perspective view showing in particular the bottom of a rack or basket in which dishes are disposed for washing and rinsing.

Like characters of reference refer to like parts throughout the several views.

Referring to the drawings, particularly Figs. 1 and 2 thereof, the reference numeral 10 designates the casing of a dishwashing and rinsing machine having opposite side walls 11 and 12, opposite end walls 13 and 14, a top 15 and a bottom 16. The opposite side walls, opposite end walls, top and bottom form a washing and rinsing chamber 17 within the casing. Legs 18, which support the casing 10, are secured to the four corners of the casing.

A track on which dish racks or baskets are conveyed through the washing and rinsing chamber 17 is disposed intermediate the top 15 and bottom 16. As shown, the track comprises L-shaped track members 19 and 20 which extend parallel to one another and longitudinally of chamber 17 in the same horizontal plane and are secured at the opposite ends thereof to end walls 13 and 14 respectively thereby forming a guideway through chamber 17 for a dish rack. The track members are laterally spaced from one another in the washing and rinsing chamber a sufficient distance to accommodate a dish rack of the desired width and are so mounted in the chamber that one leg of an L-shaped member extends vertically upwardly and the other leg extends horizontally toward the other L-shaped member. A plurality of rollers 21 are associated with each of the track members 19 and 20. The rollers 21 are revolubly mounted in horizontal alignment and in spaced relationship with one another on pins 22 which pins are secured in the vertically extending legs of members 19 and 20 and project inwardly toward the opposite member 19 or 20. The end walls 13 and 14 extend upwardly from the bottom 16 to a point in substantial horizontal alignment with the rollers 21 to thereby respectively provide an inlet opening 23 through which a rack or basket of dishes may enter the chamber 17 and an outlet opening 24 through which racks or baskets of dishes may be withdrawn from the chamber as will hereafter be fully described. The inlet and outlet openings are covered by flexible curtains 25 during the cleaning operation. The opposite ends of the vertically extending legs of track members 19 and 20 are flared outwardly as shown at 25 and 26, Fig. 1, so that the dish racks may be easily guided onto and off the track members.

A partition 27 extends transversely of the casing below track members 19 and 20 and intermediate the opposite ends 13 and 14 and in fluid-tight relationship with the bottom 16 and opposite side walls 11 and 12 to thereby separate the lower portion of chamber 17 into a washwater tank 28 and a rinse-water tank 29. Wash tank 28 has an overflow pipe 30 whose outlet 30' is at a predetermined maximum level in the tank while rinse tank 29 has an overflow pipe 31 whose outlet 31' is also at a predetermined maximum level. A straining screen 33 is coextensive with tanks 27 and 28 above the outlets 30' and 31' but below the level of inlet and outlet openings 23 and 24 respectively so that food particles washed and rinsed from the dishes, as will hereinafter be fully described, will not be deposited in the wash and rinse tanks.

The conveyor of the present invention comprises a bar 34 extending longitudinally of chamber 17 parallel to and between the track members 19 and 20 in a horizontal plane. The bar 34 is mounted for reciprocal horizontal movement in longitudinally spaced bearings 35 and 36 (Figs. 1 and 2). The bearings are supported in chamber 17 on channel bars 37 and 38 respectively which extend transversely of the chamber and are supported at the opposite ends thereof on side walls 11 and 12 respectively of the casing. As shown more particularly in Figs. 1 and 2, the bar 34 has a plurality of pawls pivotally mounted thereon. An end pawl 39 is pivotally mounted on a pivot bolt 40 secured to bar 34 adjacent the end thereof nearest inlet opening 23 of chamber 17, intermediate pawls 41 and 42 are pivotally mounted in respect to bar 34 intermediate the opposite ends of the bar on spaced pivot bolts 43 and 44 respectively, which bolts are secured to the bar and an end pawl 45 is pivotally mounted on a pivot bolt 45' secured to bar 34 adjacent the end thereof nearest outlet opening 24 of chamber 17. Intermediate pawl 41 is in spaced relationship to end pawl 39 a distance greater than the overall length of a basket or rack of dishes to be washed and rinsed in the dishwashing and rinsing machine of the present invention while end pawl 45 is in spaced relationship with intermediate pawl 42 a distance greater than the overall length of said rack of dishes. Intermediate pawls 41 and 42 are spaced apart a distance less than the overall length of said rack of dishes. Pawls 39, 41, 42 and 45 have an arcuate shaped actuating edge 46 (Fig. 6), a tongue 47 at one end thereof and a bottom 48 which is of greater width than tongue 47, said pawls being of such length that the tongue end 47 thereof projects upwardly beyond the horizontal plane of roller 21 when the pawls are in upright position. The pawls are so mounted on bar 34 that the arcuate edge 46 is toward outlet opening 24 of chamber 17 and are pivoted at such point intermediate the tongue end 47 thereof and the bottom end 48 that said bottom end will overbalance the tongue end and the pawls will normally be disposed in upright position by force of gravity. As shown in Fig. 6, an engaging pin 49 cooperates with each pawl which pin is secured in bar 34 to project laterally outwardly therefrom so as to engage the arcuate edge 46 thereof below the pivot point of said pawls.

Bar 34 is horizontally reciprocated by a reciprocating mechanism which, as shown more particularly in Fig. 2, comprises a motor M mounted on a platform beneath bottom 16 of chamber 17 and associated links and levers. The motor shaft has an eccentric lever 50 keyed thereto which eccentric is pivotally connected to a lever 51 which lever in turn is pivotally connected to a link 52. A transversely extending shaft 53 is rotatably mounted in bearing blocks 54 and has one end of link 52 securely mounted thereon. An actuating lever 55 is mounted at one end thereof on shaft 53 so as to turn therewith, the opposite end of said actuating lever being pivoted to one end of a clevis 56. The opposite end of the clevis is pivotally mounted on the end of the bar 34 adjacent the outlet opening 24 of the chamber 17.

In chamber 17 above wash-water tank 28 and above the level of a rack of dishes on track members 19 and 20 is a plurality of laterally spaced wash spray pipes 57 from which a plurality of jets of wash-water 58 are directed downwardly onto a rack of dishes on said track while a plurality of such wash spray pipes 59 are located below track members 19 and 20 and above screen 33 and discharge a plurality of jets of water 60 upwardly over dishes in said rack. Wash spray pipes 57 and 59 receive wash water circulated from tank 28 through outlet pipe 61 through a pump, not shown, which discharges wash water under pressure into feed pipe 62 (Fig. 1) thence into the spray pipes 57 and 59. The wash water from spray pipes 57 and 59, after passing over the dishes in said rack, flows downwardly through screen 33 into tank 28. Also, in chamber 17 above rinse-water tank 29 and above the level of a rack of dishes on track members 19 and 20 is a plurality of laterally spaced spray pipes 63 from which a plurality of jets of rinse water 64 is directed downwardly onto the dishes in said rack of dishes while a plurality of such rinse spray pipes 65 are located below track members 19 and 20 and above screen 33 and discharge a plurality of jets of water 66 upwardly over dishes in said rack. Rinse spray pipes 63 and 65 receive rinse water from rinse water tank 29 through outlet pipe 67 through a pump, not shown, which discharges rinse water into rinse feed pipe 68 (Fig. 1) thence into the spray pipes 63 and 65. The rinse water from rinse spray pipes 63 and 65 after passing over the dishes in said rack flows downwardly through screen 33 into tank 29. As shown in Fig. 2, a final rinse may be given the dishes in a dish rack by jets of rinse water 69 directed downwardly from pipe 70 and jets 71 of rinse water directed upwardly from pipe 72.

A dish rack suitable for use with the dishwashing and rinsing machine of the present invention is illustrated in Fig. 7 of the drawings. The dish rack, as shown, comprises opposite side walls 73 and 74 and opposite end walls 75 and 76. A plurality of laterally-spaced rods 77 extend longitudinally of the rack adjacent the bottom thereof between end walls 75 and 76 in which walls the opposite ends of the rods 66 are secured. Spaces 78 for receiving dishes are formed by an upper row and a lower row of laterally spaced rods 79 which extend transversely of the rack between side walls 73 and 74 in which side walls the opposite ends of the rods 79 are mounted. Rods 79 of the uppermost row and rods 79 of the lowermost row are in vertical alignment. A channel 80 extends longitudinally of the rack at the bottom thereof intermediate side members 73 and 74 and is defined at the opposite sides thereof by side members 81 and 82, the opposite ends of which are bent at right angles to the walls and secured to the end walls 75 and 76, respectively, of the rack. Pins 83 project transversely of channel 80 and are mounted at the opposite ends thereof in walls 81 and 82 of channel 80. The pins 83 are spaced laterally from one another longitudinally of channel 80 and thereby provide ratchet spaces 84 into which the tongue 47 of pawls 39, 41, 42 and 45 of conveyor bar 34 extend.

When it is desired to wash and rinse a rack of dishes in the dishwashing machine hereinabove described, the pumps, not shown, are set in operation. The pumps, respectively, withdraw wash water from wash-water tank 28 and discharge it into wash-water spray pipes 57 and 59 through feed pipe 62 and which withdraw rinse-water from rinse-water tank 29 through outlet pipe 67 and discharge said rinse-water into rinse spray pipes 63 and 65 through rinse feed pipe 68. The motor M is placed in operation so that conveyer bar 34 is reciprocated in a horizontal plane. As the shaft of motor M is rotated, eccentric lever 50 is rotated which reciprocates lever 51. Reciprocation of lever 51 alternately moves link 52 and shaft 53 in a clockwise and counterclockwise direction. Such movement of shaft 53 causes actuating lever 55 to alternately move in a clockwise and counterclockwise direction thereby reciprocating clevis 56 and bar 34. A rack of dishes is then inserted through inlet opening 23 of chamber 17, as indicated in dot-and-dash lines to the right of Fig. 2, until one of the pins 83 extending across channel 80 of the dish rack engages tongue 47 of pawl 39. Engagement of the first pin 83 of tongue 47 of pawl 39 will cause the pawl to move in a counterclockwise direction on pivot 40. When bar 34 moves to the right, Fig. 2, tongue 47 passes into alignment with the space 82 between the first-mentioned pin 83 and the second pin 83 which is next adjacent to said first-mentioned pin. The pawl, by force of gravity, then turns in a clockwise direction, the tongue 47 of said pawl entering the ratchet space 82 between said first-mentioned and said second pins. Upon return movement of bar 34 to the left, Fig. 2, tongue 47 of pawl 39 engages said first-mentioned pin 83 and, since the curved surface of pawl 39 engages pin 49 on bar 34 turning of the pawl 47 on said pivot 40 is prevented and the dish rack is advanced toward and into chamber 17 by engagement of tongue 47 with said first-mentioned pin 83 as bar 34 moves to the left, Fig. 2. In this manner, the dish rack is advanced to the left, Fig. 2, into chamber 17 to the extent of the movement of bar 34 to the left.

When bar 34 has reached the full extent of its movement to the left, it is returned to the right by motor M through the reciprocating mechanism, as hereinabove described, pawl 39 pivoting in a counterclockwise direction on pivot 40, as it engages the second pin 83, so that it no longer projects into the space between the first two pivot pins 83 and, upon further movement to the right of bar 34 passes into alignment with the space between the second pin 83 and third pivot pin 83. At this time pawl 39, by force of gravity, turns in a clockwise direction, tongue 47 moving into the space between the second and third pin. When bar 34 reaches the full extent of its movement to the right, Fig. 2, the reciprocating mechanism then acts to return the bar to the left and the operation above described is repeated advancing the dish rack into chamber 17 as bar 34 is reciprocated and as pawl 39 is moved from space to space between adjacent pins 83. This operation continues until the rack of dishes is advanced into chamber 17 such distance that tongue 47 of pawl 39 does not engage the last pin 83 at the right-hand end of the dish rack (Fig. 2) in bar's 34 movement to the left (Fig. 2), at which time the dish rack has become disengaged from said pawl and comes to rest in its dwell position D, as shown in Fig. 2, in which position the rack of dishes is at rest and not subject to movement by bar 34. Pawls 39 and 41 on bar 34 are spaced such distance apart that when the rack of dishes is in its dwell position D, as shown in Fig. 2, neither of said pawls engages the pins 83 so that, as bar 34 continues to reciprocate, neither of the pawls act upon the rack and the rack remains in said dwell position. In the dwell position as mentioned, the dishes in the dish rack are washed by jets of water 58 directed downwardly from wash pipe 57 onto the dishes in said rack and by jets of water 60 directed upwardly onto the dishes in the rack, which jets 60 issue from lower wash spray pipe 59.

So that the rack of dishes, when washing thereof is completed, may be moved forwardly from dwell position D toward the rinse potion of chamber 17 without the operator's coming into contact with any of the spray or steam from the washing chamber, a dish rack actuator 85 is provided. The dish rack actuator 85, as shown more particularly in Figs. 3 to 5, comprises a rotatable rod 86, which rod 86 is rotatably mounted in a bearing 87. The bearing 87, in turn, is mounted against movement on side wall 12 and extend inwardly into chamber 17 at right angles to said side wall. Outwardly of side wall 12, is a handle 88 secured to rotatable rod 86 and by means of which an operator may rotate said rod. Mounted on the inner end of rod 86, which inner end of the rod extends inwardly into chamber 17 beyond the track member 20 and short of track member 19, is an arm 89. Arm 89 is mounted on rod 86 to rotate therewith. A finger 90 is rotatably mounted on a pin 91 secured to arm 89. Finger 90 has a stop 92 which engages arm 89 and limits the movement of finger 90 in a clockwise direction. Movement of finger 90 in a counterclockwise direction is against the tension of spring 93, one end of which is attached to finger 90 and the other end of which is secured to a projection 94 on arm 89. Finger 90 is of such length that when in position A (Fig. 3) it projects upwardly to a point beyond the bottom of a dish rack positioned on the rollers 21 on racks 19 and 20. A shelf member 95 has a rearward shelf 97 and a forward shelf 96 upon which rearward shelf the finger 90 rests when said finger is in its furthermost clockwise movement, position B (Fig. 3) and upon which forward shelf said finger rests when in its furthermost counterclockwise movement, position C (Figs. 3 and 4).

When the washing operation is completed and it is desired to move the rack of dishes from its dwell position D in the washing chamber 17, handle 88 on rotatable rod 86, assuming that finger 97 is in position B (Fig. 3), is moved in a counterclockwise direction which turns rod 86 in a counterclockwise direction moving finger 90 from position B to position A, as shown in dot-and-dash lines, Fig. 3. In position A, the finger 90 engages end wall 76 of the dish rack. Upon further movement of rotatable rod 86 in a counterclockwise direction by movement of external handle 88, the dish rack is moved on rollers 21 on track members 19 and 20 to the left, Fig. 2, by engagement of finger 90 with end wall 76 of the dish rack until such time as finger 90 reaches position E (Fig. 3) at which time the foremost or first-mentioned pin 83 on rack of dishes 62 engages pawl 41. From this position, the operator may continue to move handle 88 and finger 90 in a counterclockwise direction until said finger engages rearward shelf 96 in position C which prevents further movement of the finger in a counterclockwise direction.

The action of pawl 41 during reciprocation of rod 34 upon the rack of dishes is the same as the action of pawl 39 thereon as hereinabove described, the pawl 41 successively engaging laterally adjacent pins 83 in the dish rack and moving the dish rack to the left, Fig. 2, toward the rinse chamber of the dishwashing and rinsing machine of the present invention. As the rack of dishes is advanced toward the left, Fig. 2, the pins 83 of the dish rack engage pawl 42 which assist pawl 41 in moving the dish rack to the left towards the rinse chamber, the action of pawls 41 and 42 upon the dish rack advancing said rack until the rack is disengaged from pawl 41. After said disengagement pawl 42 advances the dish rack into the rinse chamber and into dwell position D'. In dwell position D', pawl 42 and pins 83 on the rack are in disengaged relationship and further movement of the rack to the left by reciprocation of bar 34 is prevented. In dwell position D' in the rinse chamber, the dishes are rinsed by rinse-water which is pumped by a pump, not shown, from rinse-water tank 29 through outlet pipe 67 into upper rinse spray pipes 63 through pipe 68 and into lower rinse pipe 65 through said pipe 68, the rinse water issuing downwardly from spray pipe 63 onto the dishes and upwardly from spray pipes 65 onto said dishes.

When the rinsing operation is completed and it is desired to move the rack of dishes from dwell position D' in the rinse chamber toward outlet opening 24 of the dish washing machine, another dish rack actuator 85, which, as shown, is the same as the dish rack actuator hereinbefore described, is provided so that such movement may be accomplished by the operator without his coming into contact with rinse-water or steam within the dish washing machine. In operation of dish rack actuator 85 associated with the rinse chamber, which operation is the same as the operation of dish rack actuator 85 associated with the dishwashing compartment, finger 90 engages end member 76 of the dish rack and as the actuator is turned in a counterclockwise direction moves the rack forwardly (to the left Fig. 2) until pins 83 of said rack are engaged by pawl 45 on rod 34. Engagement of pawl 45 with pins 83 of the rack causes the rack to move to the left in the same manner as engagement of pawls 39, 41 and 42 with said pins of the rack causes the same to be moved to the left, as hereinabove described. Pawls 42 and 45 are so spaced apart from one another on rod 34 that neither pawl engages the rack, as rod 34 is reciprocated, when the rack is in the dwell position D' in the rinsing chamber. Pawl 45 is so spaced from outlet opening 24 of the dish washing and rinsing machine that the forward end of the dish rack will be moved through opening 24 prior to the time pawl 45 disengages the last pin 83 in the dish rack.

Should the handle 88 on rotatable rod 86 be left in such position by the operator that finger 90 projects into the path of a rack of dishes moving from the right to the left Fig. 2, the finger 90 will move in a counterclockwise direction to position F, illustrated in Fig. 5, against the tension of spring 93 and be maintained in such position until end member 76 of the rack passes beyond the finger at which time the spring 93 will cause the finger to move in a clockwise direction into an upright position so that upon movement of rod 86 in a counterclockwise direction the finger will engage member 76 of the rack and move the rack to the left Fig. 2.

Inasmuch as various modifications may be made in the form of the apparatus herein disclosed and the location and relative arrangement of the several parts of the invention without departing from the principles thereof, it will be understood that the invention is not to be limited, excepting by the scope of the appended claims.

What is claimed is:

1. Conveying apparatus for a dishwashing machine comprising a casing having a chamber therein, said casing having an inlet through which a rack containing dishes is passed into the chamber and an outlet through which the rack is passed from the chamber, the conveying apparatus comprising actuating means and other actuating means, said actuating means being adapted to operatively act upon a dish rack and advance said rack from the casing inlet to a dwell position in the chamber and in the dwell position to become inoperative in respect to the rack, said other actuating means being out of operative relationship with said rack when the rack is in the dwell position and positioned to operatively act upon said rack beyond the dwell position when the rack is moved from the dwell position toward said outlet, and a dish rack actuator operable from outside said casing into and out of operative relationship with said dish rack in the dwell position, the actuator comprising a rotatably mounted shaft extending from outwardly of the casing into the chamber, rack engaging means mounted on and rotatable with the shaft, a handle on said shaft outwardly of the casing to turn the shaft, said rack engaging means being adapted to engage the rack and move it toward the casing outlet and into operative relationship with said other actuating means of the conveying apparatus when turned in one direction and out of engagement with said rack when turned in the opposite direction.

2. Conveying apparatus for a dishwashing machine comprising a casing having a chamber therein, said casing having an inlet through which a rack containing dishes is passed into the chamber and an outlet through which the rack is passed from the chamber, the conveying apparatus comprising actuating means and other actuating means, said actuating means being adapted to operatively act upon a dish rack and advance said rack from the casing inlet to a dwell position in the chamber and in the dwell position to become inoperative in respect to the rack, said other actuating means being out of operative relationship with said rack when the rack is in the dwell position and positioned to operatively act upon said rack beyond the dwell position when the rack is moved from the dwell position toward said outlet, and a dish rack actuator operable from outside said casing into and out of operative relationship with the dish rack in the dwell position, the actuator comprising a rotatably mounted shaft extending from outwardly of the casing into the chamber, rack engaging means, said rack engaging means comprising an arm mounted on and rotatable with the shaft, a spring, a finger rotatably mounted on the arm and adapted to engage said rack and move it toward the casing outlet, said finger being rotatable against the tension of said spring in the direction of movement of the rack toward the the casing outlet, means for limiting the rotation of said finger in the direction opposite said direction of movement of the rack toward said casing outlet, the actuator being adapted when in said operative relationship to move the dish rack from the dwell position toward the casing outlet and into operative relationship with said other actuating means of the conveying apparatus when turned in one direction and out of engagement with the rack when turned in the opposite direction.

3. Conveying apparatus for a dishwashing machine comprising a casing having a chamber therein in which chamber dishes in a dish rack are washed, said casing having an inlet through which a rack containing dishes is passed into the chamber and an outlet through which the rack is passed from the chamber, the conveying apparatus comprising actuating means and other actuating means, said actuating means being adapted to operatively act upon a dish rack and advance said rack from the casing inlet to a dwell position in the chamber said other actuating means beings out of operative relationship with said rack when the rack is in the dwell position and positioned to operatively act upon said rack beyond the dwell position when the rack is moved from said dwell position to another dwell position beyond said first-mentioned dwell position in the direction of movement of the rack toward the casing outlet and in each of the dwell positions each of said actuating means becoming inoperative in respect to said rack, further actuating means out of operative relationship with said rack when the rack is in the other dwell position and positioned to operatively act upon said rack when the rack is moved beyond the other dwell position toward said outlet, and dish rack actuator means operative in each dwell position, the actuator means being operable from outside said casing into and out of operative relationship with the dish rack in the dwell positions, each actuator means comprising a rotatably mounted shaft extending from outwardly of the casing into the chamber, rack engaging means, said rack engaging means comprising an arm mounted on and rotatable with the shaft, a spring, a finger rotatably mounted on the arm and adapted to engage said rack and move it toward the casing outlet, said finger being rotatable against the tension of said spring in the direction of movement of the rack toward the casing outlet, means for limiting the rotation of said finger in the direction opposite said direction of movement of the rack toward said casing outlet, the actuator means being adapted when in said operative relationship to move the dish rack from the dwell position toward the casing outlet and into operative relationship with said other or further actuating means of the conveying apparatus.

4. Conveying apparatus for a dishwashing machine comprising a casing having a chamber therein, said casing having an inlet through which a rack containing dishes is passed into the chamber and an outlet through which the rack is passed from the casing, said conveying apparatus comprising reciprocating means having thereon actuating means and other actuating means, said actuating means being adapted and to operatively act upon a dish rack and advance the rack from the chamber inlet to a dwell position in the chamber and in said dwell position to become inoperative in respect to the rack, said other actuating means being out of operative relationship with said rack when the rack is in the dwell position and positioned to operatively act upon said rack beyond the dwell position when the rack is moved from the dwell position toward said outlet, means for imparting reciprocal movement to the reciprocating means, and a dish rack actuator operable from outside said chamber into and out of operative relationship with the dish rack in the dwell position, the actuator comprising a rotatably mounted shaft extending from outwardly of the casing into the chamber, rack engaging means mounted on and rotatable with the shaft, a handle on said shaft outwardly of the casing to turn the shaft in opposite directions, said rack engaging means being adapted to engage the rack and move it toward the casing outlet and into operative relationship with said other actuating means on the reciprocating means to be moved thereby to the casing outlet when turned in one direction and out of engagement with the rack when turned in the opposite direction.

5. Conveying apparatus for a dishwashing machine comprising a casing having a chamber therein, said casing having an inlet through which a rack containing dishes is passed into the chamber and an outlet through which the rack is passed from the casing, said conveying apparatus comprising reciprocating means having thereon actuating means, other actuating means and further actuating means, said actuating means being adapted to operatively act upon a dish rack and advance said rack from the chamber inlet to a dwell position in the chamber, said other actuating means being adapted to operatively act upon a dish rack beyond said dwell position and advance said rack to another dwell position beyond said first-mentioned dwell position in the direction of movement of the rack toward the casing outlet, the further actuating means being adapted to operatively act upon the dish rack beyond said other dwell position and advance the rack toward the casing inlet, said actuating means and other actuating means in each of said dwell positions becoming inoperative in respect to the rack, means for imparting reciprocal movement to the reciprocating means, and dish rack actuator means operative in each dwell position, the actuator means being operable from outside said casing into and out of operative relationship with the dish rack in the dwell positions, the actuator means comprising a rotatably mounted shaft extending from outwardly of the casing into the chamber, rack engaging means mounted on and rotatable with the shaft, a handle on said shaft outwardly of the casing to turn the shaft, said rack engaging means being adapted to engage the rack and move it toward the casing and into operative relationship with said actuating means, other actuating means or further actuating means on said reciprocating means to be moved thereby to the casing outlet when turned in one direction and out of engagement with said rack when turned in the opposite direction.

6. A conveyor for a dishwashing machine comprising a casing having a chamber therein, said casing having an inlet through which the rack is passed into the chamber and an outlet through which the rack is passed from the chamber, said conveyor comprising a horizontally extending guideway for the rack which guideway extends through the chamber, a substantially horizontally extending actuating bar positioned adjacent said guideway and intermediate the opposite sides thereof, the bar being mounted for reciprocal longitudinal movement, a plurality of pawls mounted on said bar and longitudinally spaced from one another along the bar, said pawls being adapted to operatively act upon a rack when the bar moves in one direction only and thereby intermittently advance the rack from the casing inlet to the casing outlet on said guideway, means for imparting horizontal reciprocal movement to said bar, at least one of said pawls being positioned on the bar so as to operatively engage the rack and advance said rack from the casing inlet to a dwell position in the chamber and to disengage said rack in the dwell position, at least another pawl positioned on said bar beyond the dwell position toward said casing outlet and so spaced from said at least one pawl as not to engage the rack in the dwell position, and a dish rack actuator operable from outside the casing into and out of operative relationship with the dish rack in said dwell position, the actuator comprising a rotatably mounted shaft extending from outwardly of the casing into the chamber, rack engaging means mounted on and rotatable with the shaft, a handle on said shaft outwardly of the casing to turn the shaft, said rack engaging means being adapted to engage the rack and move it from the dwell position toward the casing outlet and into operative relationship with said other pawl on said conveying apparatus when turned in one direction and out of engagement with said rack when turned in the opposite direction.

7. A conveyor for a dishwashing machine comprising a casing having a chamber therein, said casing having an inlet through which the rack is passed into the chamber and an outlet through which the rack is passed from the chamber, said conveyor comprising a horizontally extending guideway for the rack which guideway comprises two laterally spaced, parallel tracks extending through the chamber, a substantially horizontally extending actuating bar positioned adjacent said guideway and intermediate the tracks, the bar being mounted for reciprocal longitudinal movement, a plurality of pawls mounted on the bar and longitudinally spaced from one another, said pawls being adapted to operatively act upon a rack when the bar moves in one direction only and thereby intermittently advance the rack from the casing inlet to the casing outlet on said guideway, means for imparting horizontal reciprocal movement to the bar, at least one of said pawls being positioned on the bar so as to operatively engage the rack and advance said rack from the chamber inlet to a dwell position in the chamber and to disengage said rack in the dwell position, at least another pawl positioned on said bar beyond the dwell position toward said casing outlet and so spaced from said at least one pawl as not to engage the rack in the dwell position, and a dish rack actuator operable from outside said chamber into and out of operative relationship with the dish rack in said dwell position, the actuator comprising a rotatably mounted shaft extending from outwardly of the casing into the chamber, rack engaging means mounted on and rotatable with the shaft, a handle on said shaft outwardly of the casing to turn the shaft, said rack engaging means being adapted to extend upwardly between the tracks and engage said track and move it toward the chamber outlet and into operative relationship with said other pawl on the conveying apparatus when turned in one direction and out of engagement with said rack when turned in the opposite direction.

8. A conveyor for a dishwashing machine comprising a casing having a chamber therein, said casing having an inlet through which the rack is passed into the chamber and an outlet through which the rack is passed from the chamber, said conveyor comprising a horizontally extending guideway for the rack which guideway comprises two laterally spaced, parallel tracks extending through the chamber, a substantially horizontally extending actuating bar positioned adjacent said guideway and intermediate the tracks, the bar being mounted for reciprocal longitudinal movement, a plurality of pawls mounted on the bar and longitudinally spaced from one another, said pawls being adapted to operatively act upon a rack when the bar moves in one direction only and thereby intermittently advance the rack from the casing inlet to the casing outlet on said guideway, means for imparting horizontal reciprocal movement to the bar, at least one of said pawls being positioned on the bar so as to operatively engage the rack and advance said rack from the chamber inlet to a dwell position in the chamber and to disengage said rack in the dwell position, at least another pawl positioned on said bar beyond the dwell position toward said casing outlet and so spaced from said at least one pawl as not to engage the rack in the dwell position, and a dish rack actuator operable from outside said chamber into and out of operative relationship with the dish rack in said dwell position, the actuator comprising a rotatably mounted shaft extending from outwardly of the casing into the chamber, rack engaging means, said rack engaging means comprising an arm mounted on and rotatable with the shaft, a spring, a finger rotatably mounted on the arm and adapted to engage said rack and move it toward the casing outlet, said finger being rotatable against the tension of said spring in the direction of movement of the rack toward the casing outlet, means for limiting the rotation of said finger in the direction opposite said direction of movement of the rack toward said casing outlet, the actuator being adapted when in said operative relationship to move the dish rack from its dwell position toward and into engagement with said other pawl to be advanced toward the casing outlet.

9. A conveyor for a dishwashing machine comprising a casing having a chamber therein, said casing having an inlet through which the rack is passed into the chamber and an outlet through which the rack is passed from the casing, said conveyor comprising a horizontally extending guideway for the rack which guideway comprises two laterally spaced, parallel tracks extending through the chamber, a substantially horizontally extending actuating bar positioned adjacent the guideway and intermediate the tracks, the bar being mounted for reciprocal longitudinal movement, a plurality of pawls mounted on the bar and longitudinally spaced from one another, said pawls being adapted to operatively act upon a rack when the bar moves in one direction only and thereby intermittently advance the rack from said casing inlet to the casing outlet on said guideway, means for imparting horizontal reciprocal movement to the bar, at least one of said pawls being positioned on the bar so as to operatively engage the rack and advance said rack from the chamber inlet to a dwell position in the chamber and to disengage said rack in the dwell position, at least another pawl positioned on said bar beyond the dwell position toward said casing outlet and so spaced from said at least one pawl as not to engage said rack in the dwell position, a further pawl positioned on the bar beyond the other dwell position toward the casing outlet so spaced from said other pawl as not to engage the rack in the other dwell position, and a dish rack actuator associated with each dwell position and operable from outside said casing into and out of operative relationship with the dish rack in the dwell positions, the actuators comprising a rotatably mounted shaft extending from outwardly of the casing into the chamber in a plane transverse to the plane of said tracks, rack engaging means mounted on and rotatable with the shaft, a handle on said shaft outwardly of the casing to turn the shaft in opposite directions, said rack engaging means being adapted to extend upwardly between the tracks and engage said rack and move it toward the chamber outlet and into engagement with the pawls on the chamber outlet side of said dwell positions to be advanced toward the casing outlet.

10. A conveyor for a dishwashing machine comprising a casing having a chamber therein, said casing having an inlet through which the rack is passed into the chamber and an outlet through which the rack is passed from the casing, said conveyor comprising a horizontally extending guideway for the rack which guideway comprises two laterally spaced, parallel tracks extending through the chamber, a substantially horizontally extending actuating bar positioned adjacent the guideway and intermediate the tracks, the bar being mounted for reciprocal longitudinal movement, a plurality of pawls mounted on the bar and longitudinally spaced from one another, said pawls being adapted to operatively act upon a rack when the bar moves in one direction only and thereby intermittently advance the rack from said casing inlet to the casing outlet on said guideway, means for imparting horizontal reciprocal movement to the bar, at least one of said pawls being positioned on the bar so as to operatively engage the rack and advance said rack from the chamber inlet to a dwell position in the chamber and to disengage said rack in the dwell position, at least another pawl positioned on said bar beyond the dwell position toward said casing outlet and so spaced from said at least one pawl as not to engage said rack in the dwell position, a further pawl positioned on the bar beyond the outer dwell position toward the casing outlet so spaced from said other pawl as not to engage the rack in the other dwell position, and a dish rack actuater associated with each dwell position and operable from outside said casing into and out of operative relationship with the dish rack in the dwell positions, the actuators comprising a rotatably mounted shaft extending from outwardly of the casing and into the chamber in a plane transverse to the plane of said tracks, rack engaging means, said rack engaging means comprising an arm mounted on and rotatable with the shaft, a spring, a finger rotatably mounted on the arm and adapted to be rotated into an upward position between the tracks to engage said rack and move it toward the chamber outlet, said finger being rotatable against the tension of said spring in the direction of movement of the rack toward the casing outlet, means for limiting the rotation of said finger in the direction opposite said direction of movement of the rack toward said casing outlet, said actuators being adapted when in their operative position to move the dish rack from its dwell position toward and into engagement with the pawls on the chamber outlet side of said dwell positions to be advanced toward the casing outlet.

11. Conveying apparatus for a dishwashing machine comprising a casing having a chamber therein, said casing having an inlet through which a rack containing dishes is passed into the chamber and an outlet through which the rack is passed from the chamber, the conveying apparatus comprising actuating means and other actuating means, said actuating means being adapted to operatively act upon a dish rack and advance said rack from the casing inlet to a dwell position in the chamber and in the dwell position to become inoperative in respect to the rack, said other actuating means being out of operative relationship with said rack when the rack is in the dwell position and positioned to operatively act upon said rack beyond the dwell position when the rack is moved from the dwell position toward said outlet, and a dish rack actuator operable from outside said casing into and out of operative relationship with said dish rack in the dwell position, the actuator comprising a rotatably mounted shaft extending from outwardly of the casing into the chamber, rack engaging means mounted on and rotatable with the shaft, said rack engaging means being adapted to engage the rack and move it toward the casing outlet and into operative relationship with said other actuating means of the conveying apparatus when turned in one direction and out of engagement with said rack when turned in the opposite direction.

12. Conveying apparatus for a dishwashing machine comprising a casing having a dishwashing chamber therein in which chamber dishes in a dish rack are washed, said casing having an inlet through which a rack containing dishes is passed into the chamber and an outlet through which the rack is passed from the chamber, the conveying apparatus comprising actuating means and other actuating means, said actuating means being adapted to operatively act upon a dish rack and advance said rack from the casing inlet to dwell position in the chamber, said other actuating means being out of operative relationship with said rack when the rack is in the dwell position and positioned to operatively act upon said rack beyond the dwell position when the rack is moved from said dwell position to another dwell position beyond said first-mentioned dwell position in the direction of movement of the rack toward the casing outlet and in each of the dwell positions each of said actuating means becoming inoperative in respect to said rack, further actuating means out of operative relationship with said rack when the rack is in the other dwell position and positioned to operatively act upon said rack when the rack is moved beyond the other dwell position toward said outlet, and dish rack actuator means operative in each dwell position, the actuator means being operable from outside said casing into and out of operative relationship with the dish rack in the dwell positions, each actuator means comprising a rotatably mounted shaft extending from outwardly of the casing into the chamber, rack engaging means mounted on and rotatable with the shaft, said rack engaging means being adapted to engage the rack and move it toward the casing outlet and into operative relationship with said other actuating means of the conveying apparatus when turned in one direction and out of engagement with said rack when turned in the opposite direction.

13. Conveying apparatus for a dishwashing machine comprising a casing having a chamber therein, said casing having an inlet through which a rack containing dishes is passed into the chamber and an outlet through which the rack is passed from the casing, said conveying apparatus comprising reciprocating means having thereon actuating means and other actuating means, said actuating means being adapted to operatively act upon a dish rack and advance the rack from the chamber inlet to a dwell position in the chamber and in said dwell position to become inoperative in respect to the rack, said other actuating means being out of operative relationship with said rack when the rack is in the dwell position and positioned to operatively act upon said rack beyond the dwell position when the rack is moved from the dwell position toward said outlet, and a dish rack actuator operable from outside said chamber into and out of operative relationship with the dish rack in the dwell position, the actuator comprising a rotatably mounted shaft extending from outwardly of the casing into the chamber, rack engaging means mounted on and rotatable with the shaft, said rack engaging means being adapted to engage the rack and move it toward the casing outlet and into operative relationship with said other actuating means on the reciprocating means to be moved thereby to the casing outlet when turned in one direction and out of engagement with the rack when turned in the opposite direction.

References Cited in the file of this patent

UNITED STATES PATENTS

| | | |
|---|---|---|
| 829,547 | Schwarzenbach | Aug. 28, 1906 |
| 1,660,345 | Merseles | Feb. 28, 1928 |
| 1,688,654 | Quant | Oct. 23, 1928 |
| 1,723,880 | Paltzer | Aug. 6, 1929 |
| 1,922,972 | Miller | Aug. 15, 1933 |
| 2,073,521 | Johnston | Mar. 9, 1937 |